US010310802B2

United States Patent
Rosenberg

(10) Patent No.: US 10,310,802 B2
(45) Date of Patent: Jun. 4, 2019

(54) SYSTEM AND METHOD FOR MODERATING REAL-TIME CLOSED-LOOP COLLABORATIVE DECISIONS ON MOBILE DEVICES

(71) Applicant: Unanimous A. I., Inc., San Francisco, CA (US)

(72) Inventor: Louis B. Rosenberg, San Luis Obispo, CA (US)

(73) Assignee: Unanimous A. I., Inc., San Francisco, CA (US)

( * ) Notice: Subject to any disclaimer, the term of this patent is extended or adjusted under 35 U.S.C. 154(b) by 106 days.

(21) Appl. No.: 15/086,034

(22) Filed: Mar. 30, 2016

(65) Prior Publication Data

US 2016/0209992 A1 Jul. 21, 2016

Related U.S. Application Data

(63) Continuation-in-part of application No. 14/668,970, filed on Mar. 25, 2015, and a continuation-in-part of
(Continued)

(51) Int. Cl.
*G06F 3/16* (2006.01)
*H04L 29/06* (2006.01)
(Continued)

(52) U.S. Cl.
CPC .......... *G06F 3/165* (2013.01); *G06F 3/04883* (2013.01); *H04L 67/10* (2013.01);
(Continued)

(58) Field of Classification Search
CPC .... G06F 3/165; G06F 3/04883; G06F 3/0481; G06F 3/04847; H04L 67/10;
(Continued)

(56) References Cited

U.S. PATENT DOCUMENTS 5,236,199 A 8/1993 Thompson, Jr.
5,400,248 A 3/1995 Chisholm
(Continued)

FOREIGN PATENT DOCUMENTS

CA 2414397 8/2003
JP 2010191533 9/2010
(Continued)

OTHER PUBLICATIONS

Beni; "From Swarm Intelligence to Swarm Robotics"; Swarm Robotics WS 2004, LNCS 3342; pp. 1-9; 2005.
(Continued)

*Primary Examiner* — Amy M Levy
(74) *Attorney, Agent, or Firm* — Fitch, Even, Tabin & Flannery LLP

(57) ABSTRACT

Systems and methods for real-time collaborative computing and collective intelligence are disclosed. A collaborative application runs on a collaborative server connected to a plurality of portable computing devices. During repeated time-steps each portable computing device receives user input regarding a media item and sends an indication of the user input to the collaborative server. The collaborative application determines a Group Approval value based at least in part on the indications of the user inputs and sends an indication of the Group Approval value to the portable computing devices.

19 Claims, 3 Drawing Sheets

Related U.S. Application Data application No. 14/708,038, filed on May 8, 2015, and a continuation-in-part of application No. 14/738,768, filed on Jun. 12, 2015, and a continuation-in-part of application No. 14/859,035, filed on Sep. 18, 2015, and a continuation-in-part of application No. 14/920,819, filed on Oct. 22, 2015, and a continuation-in-part of application No. 14/925,837, filed on Oct. 28, 2015, and a continuation-in-part of application No. 15/017,424, filed on Feb. 5, 2016, and a continuation-in-part of application No. 15/047,522, filed on Feb. 18, 2016, and a continuation-in-part of application No. 15/052,876, filed on Feb. 25, 2016, and a continuation-in-part of application No. PCT/US2015/022594, filed on Mar. 25, 2015, and a continuation-in-part of application No. PCT/US2015/035694, filed on Jun. 12, 2015, and a continuation-in-part of application No. PCT/US2015/056394, filed on Oct. 20, 2015.

(60) Provisional application No. 62/140,032, filed on Mar. 30, 2015, provisional application No. 61/970,885, filed on Mar. 26, 2014, provisional application No. 61/991,505, filed on May 10, 2014, provisional application No. 62/012,403, filed on Jun. 15, 2014, provisional application No. 62/066,718, filed on Oct. 21, 2014, provisional application No. 62/067,505, filed on Oct. 23, 2014, provisional application No. 62/069,360, filed on Oct. 28, 2014, provisional application No. 62/113,393, filed on Feb. 7, 2015, provisional application No. 62/117,808, filed on Feb. 18, 2015, provisional application No. 62/120,618, filed on Feb. 25, 2015.

(51) Int. Cl.
  *H04L 29/08* (2006.01)
  *G06F 3/0488* (2013.01)

(52) U.S. Cl.
  CPC ............ *H04L 67/104* (2013.01); *H04L 67/12* (2013.01); *H04L 67/125* (2013.01); *H04L 67/42* (2013.01)

(58) Field of Classification Search
  CPC ....... H04L 67/125; H04L 67/42; H04L 67/12; H04L 67/104; E21B 47/18; E21B 47/122
  See application file for complete search history.

(56) References Cited

U.S. PATENT DOCUMENTS

| | | | |
|---|---|---|---|
| 5,808,908 A | 9/1998 | Ghahramani | |
| 6,064,978 A | 5/2000 | Gardner | |
| 6,480,210 B1 | 11/2002 | Martino | |
| 7,031,842 B1 | 4/2006 | Musat | |
| 7,158,112 B2* | 1/2007 | Rosenberg | A63F 13/10 345/156 |
| 7,489,979 B2 | 2/2009 | Rosenberg | |
| 7,542,816 B2 | 6/2009 | Rosenberg | |
| 7,562,117 B2 | 7/2009 | Rosenberg | |
| 7,603,414 B2 | 10/2009 | Rosenberg | |
| 7,831,928 B1 | 11/2010 | Rose | |
| 7,917,148 B2 | 3/2011 | Rosenberg | |
| 7,937,285 B2 | 5/2011 | Goldberg | |
| 8,176,101 B2 | 5/2012 | Rosenberg | |
| 8,589,488 B2* | 11/2013 | Huston | G06Q 30/0207 455/456.1 |
| 8,745,104 B1 | 6/2014 | Rosenberg | |
| 8,762,435 B1 | 6/2014 | Rosenberg | |
| 9,483,161 B2 | 11/2016 | Wenger | |
| 2002/0042920 A1 | 4/2002 | Thomas | |
| 2002/0129106 A1 | 9/2002 | Gutfreund | |
| 2002/0171690 A1 | 11/2002 | Fox | |
| 2003/0065604 A1 | 4/2003 | Gatto | |
| 2003/0079218 A1 | 4/2003 | Goldberg | |
| 2004/0210550 A1 | 10/2004 | Williams | |
| 2005/0067493 A1 | 3/2005 | Urken | |
| 2005/0168489 A1 | 8/2005 | Ausbeck | |
| 2005/0218601 A1 | 10/2005 | Capellan | |
| 2005/0261953 A1 | 11/2005 | Malek | |
| 2006/0147890 A1 | 7/2006 | Bradford | |
| 2006/0200401 A1 | 9/2006 | Lisani | |
| 2006/0250357 A1 | 11/2006 | Safai | |
| 2007/0039031 A1* | 2/2007 | Cansler, Jr. | H04N 21/4821 725/110 |
| 2007/0097150 A1 | 5/2007 | Ivashin | |
| 2007/0099162 A1 | 5/2007 | Sekhar | |
| 2007/0124503 A1 | 5/2007 | Ramos | |
| 2007/0211050 A1 | 9/2007 | Ohta | |
| 2007/0220100 A1 | 9/2007 | Rosenberg | |
| 2008/0091777 A1 | 4/2008 | Carlos | |
| 2008/0103877 A1 | 5/2008 | Gerken | |
| 2009/0037355 A1 | 2/2009 | Brave | |
| 2009/0063379 A1* | 3/2009 | Kelly | G06Q 10/00 706/46 |
| 2009/0063463 A1 | 3/2009 | Turner | |
| 2009/0063991 A1 | 3/2009 | Baron | |
| 2009/0063995 A1* | 3/2009 | Baron | G06Q 10/10 715/753 |
| 2009/0239205 A1 | 9/2009 | Morgia | |
| 2009/0254836 A1* | 10/2009 | Bajrach | G11B 27/031 715/745 |
| 2009/0287685 A1* | 11/2009 | Charnock | G06F 17/30722 |
| 2009/0325533 A1 | 12/2009 | Lele | |
| 2010/0145715 A1 | 6/2010 | Cohen | |
| 2010/0169144 A1 | 7/2010 | Estill | |
| 2010/0174579 A1 | 7/2010 | Hughes | |
| 2010/0299616 A1 | 11/2010 | Chen | |
| 2011/0016137 A1 | 1/2011 | Goroshevsky | |
| 2011/0080341 A1 | 4/2011 | Helmes | |
| 2011/0087687 A1 | 4/2011 | Immaneni | |
| 2011/0119048 A1 | 5/2011 | Shaw | |
| 2011/0141027 A1 | 6/2011 | Ghassabian | |
| 2011/0166916 A1 | 7/2011 | Inbar | |
| 2011/0320536 A1 | 12/2011 | Lobb | |
| 2012/0005131 A1 | 1/2012 | Horvitz | |
| 2012/0011006 A1 | 1/2012 | Schultz | |
| 2012/0013489 A1* | 1/2012 | Earl | G06F 1/1626 341/23 |
| 2012/0072843 A1 | 3/2012 | Durham | |
| 2012/0079396 A1 | 3/2012 | Neer | |
| 2012/0109883 A1 | 5/2012 | Iordanov | |
| 2012/0191774 A1* | 7/2012 | Bhaskaran | H04H 60/33 709/203 |
| 2012/0290950 A1 | 11/2012 | Rapaport | |
| 2013/0013248 A1 | 1/2013 | Brugler | |
| 2013/0041720 A1 | 2/2013 | Spires | |
| 2013/0097245 A1 | 4/2013 | Adarraga | |
| 2013/0160142 A1 | 6/2013 | Lai | |
| 2013/0171594 A1 | 7/2013 | Gorman | |
| 2013/0231595 A1 | 9/2013 | Zoss | |
| 2013/0298690 A1 | 11/2013 | Bond | |
| 2013/0311904 A1 | 11/2013 | Tien | |
| 2013/0339445 A1 | 12/2013 | Perincherry | |
| 2014/0057240 A1 | 2/2014 | Colby | |
| 2014/0100924 A1 | 4/2014 | Ingenito | |
| 2014/0108915 A1 | 4/2014 | Lu | |
| 2014/0128162 A1 | 5/2014 | Arafat | |
| 2014/0129946 A1* | 5/2014 | Harris | G06F 3/01 715/733 |
| 2014/0162241 A1 | 6/2014 | Morgia | |
| 2014/0249889 A1 | 9/2014 | Park | |
| 2014/0258970 A1 | 9/2014 | Brown | |
| 2014/0279625 A1 | 9/2014 | Carter | |
| 2014/0337097 A1 | 11/2014 | Farlie | |
| 2014/0358825 A1 | 12/2014 | Phillipps | |
| 2014/0379439 A1 | 12/2014 | Sekhar | |
| 2015/0089399 A1 | 3/2015 | Megill | |
| 2015/0149932 A1 | 5/2015 | Yamada | |

(56) References Cited

U.S. PATENT DOCUMENTS

| | | | |
|---|---|---|---|
| 2015/0156233 A1* | 6/2015 | Bergo | H04L 65/403 715/753 |
| 2015/0170050 A1 | 6/2015 | Price | |
| 2015/0236866 A1 | 8/2015 | Colby | |
| 2015/0302308 A1 | 10/2015 | Bartek | |
| 2015/0331601 A1 | 11/2015 | Rosenberg | |
| 2015/0347903 A1 | 12/2015 | Saxena | |
| 2016/0078458 A1 | 3/2016 | Gold | |
| 2016/0170616 A1 | 6/2016 | Rosenberg | |
| 2016/0210602 A1 | 7/2016 | Siddique | |
| 2016/0366200 A1 | 12/2016 | Healy | |
| 2017/0223411 A1 | 8/2017 | De Juan | |

FOREIGN PATENT DOCUMENTS

| | | |
|---|---|---|
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |

OTHER PUBLICATIONS

Rosenberg; U.S. Appl. No. 15/199,990, filed Jul. 1, 2016.
Rosenberg; U.S. Appl. No. 15/241,340, filed Aug. 19, 2016.
Salminen; "Collective Intelligence in Humans: A Literature Review"; Lappeenranta University of Technology, Lahti School of Innovation; 1Proceedings; 2012; 8 pages.
Unanimous A. I.; "What is Swarm Intelligence"; 2015; http://unu.ai/swarm-intelligence/; downloaded Oct. 6, 2016; 3 pages.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
PCT; International Search Report and Written Opinion of the International Searching Authority for PCT/US2016/040600 dated Nov. 29, 2016.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms, a real-time method for collective intelligence"; Proceedings of the European Conference on Artificial Life; Jul. 2015; pp. 658-659.
USPTO; Non-Final Office Action for U.S. Appl. No. 16/668,970 dated Aug. 15, 2017.
Yeung et al.; "Metacognition in human decision-making: confidence and error monitoring"; Philosophical Transactions of the Royal Society B; 2012; pp. 1310-1321.
EP; Extended European Search Report for EP Application No. 15808982.1 mailed from the European Patent Office dated Nov. 28, 2017.
USPTO; Non-Final Office Action for U.S. Appl. No. 15/047,522 dated Jan. 5, 2018.
"Dialogr—A simple tool for collective thinking"; Mar. 25, 2015; http://www.dialogr.com./; 1 page.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room"; Outland Pictures; Amazon; Mar. 30, 2014; 110 pages.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowd source . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.

(56) References Cited

OTHER PUBLICATIONS

PCT; International Search Report and Written Opinion of the International Searching Authority for PCT/US2017/040480 dated Oct. 23, 2017.
USPTO; Non-Final Office Action for U.S. Appl. No. 14/738,768 dated Sep. 8, 2017.
EP; Extended European Search Report for EP Application No. 15767909.3 mailed from the European Patent Office dated Sep. 4, 2017.
EP; Extended European Search Report for EP Application No. 15852495.9 mailed from the European Patent Office dated Mar. 21, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
USPTO; Non-Final Office Action for U.S. Appl. No. 14/925,837 dated Apr. 3, 2018.
Rosenberg: U.S. Appl. No. 15/959,080, filed Apr. 20, 2018.
USPTO; Non-Final Office Action for U.S. Appl. No. 14/920,819 dated Jun. 27, 2018.
PCT; International Search Report and Written Opinion of the International Searching Authority for PCT/US2017/062095 dated May 23, 2018.
USPTO; Notice of Allowance for U.S. Appl. No. 14/738,768 dated Feb. 2, 2018.
USPTO; Notice of Allowance for U.S. Appl. No. 14/668,970 dated Feb. 8, 2018.
Ding et al; "Time Weight Collaborative Filtering"; CIKM'05, Oct. 31-Nov. 5, 2005; Bremen, Germany; pp. 485-492.
Rosenberg; U.S. Appl. No. 15/898,468, filed Feb. 17, 2018.
Rosenberg; U.S. Appl. No. 15/904,239, filed Feb. 23, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 15/052,876 dated Feb. 22, 2018.
Rosenberg; U.S. Appl. No. 16/059,698, filed Aug. 9, 2018.
USPTO; Non-Final Office Action for U.S. Appl. No. 15/241,340 dated Jul. 19, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/241,340 dated Nov. 20, 2018.
USPTO; Notice of Allowance for U.S. Appl. No. 15/640,145 dated Nov. 15, 2018.
USPTO; Restriction Requirement for U.S. Appl. No. 15/017,424 dated Oct. 2, 2018.

\* cited by examiner

SYSTEM AND METHOD FOR MODERATING REAL-TIME CLOSED-LOOP COLLABORATIVE DECISIONS ON MOBILE DEVICES

This application claims the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS, filed Mar. 30, 2015, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turns claims the benefit of U.S. Provisional Application 61/991,505 entitled METHOD AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turns claims the benefit of U.S. Provisional Application 62/012,403 entitled INTUITIVE INTERFACE FOR REAL-TIME COLLABORATIVE CONTROL, filed Jun. 15, 2014, both of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turns claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, both of which are incorporated in their entirety herein by reference.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turns claims the benefit of U.S. Provisional Application No. 62/069,360 entitled SYSTEMS AND METHODS FOR ENABLING AND MODERATING A MASSIVELY PARALLEL REAL-TIME SYNCHRONOUS COLLABORATIVE SUPER-INTELLIGENCE, filed Oct. 28, 2014, both of which are incorporated in their entirety herein by reference.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turns claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

This application is a continuation-in-part of U.S. application Ser. No. 15/047,522 entitled SYSTEMS AND METHODS FOR COLLABORATIVE SYNCHRONOUS IMAGE SELECTION, filed Feb. 18, 2016 which in turns claims the benefit of U.S. Provisional Application No. 62/117,808 entitled SYSTEM AND METHODS FOR COLLABORATIVE SYNCHRONOUS IMAGE SELECTION, filed Feb. 18, 2015, both of which are incorporated in their entirety herein by reference.

This application is a continuation-in-part of U.S. application Ser. No. 15/052,876 entitled DYNAMIC SYSTEMS FOR OPTIMIZATION OF REAL-TIME COLLABORATIVE INTELLIGENCE, filed Feb. 25, 2016 which in turns claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, both of which are incorporated in their entirety herein by reference.

This application is a continuation-in-part of International Application No. PCT/US15/22594, filed Mar. 25, 2015.

This application is a continuation-in-part of International Application No. PCT/US15/35694, filed Jun. 12, 2015.

This application is a continuation-in-part of International Application No. PCT/US15/56394, filed Oct. 20, 2015.

BACKGROUND OF THE INVENTION

1. Field of the Invention

The present invention relates generally to systems and methods for group collaboration among networked users at distributed locations, and more specifically to systems and methods for the closed-loop derivation and display of real-time collaborative group responses among a group of networked users at distributed locations through collective real-time tapping of mobile computing devices.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to collectively express their approval or disapproval as a real-time shared experience. In the physical world a crowd can cheer, clap, or boo to express their collective approval or disapproval. In networked environments in which large groups of users are not co-located, the human ability to provide group applause is not possible. One could imagine collecting audio feedback of applause from large groups of users but that is bandwidth intensive. Also, it would be difficult to quantify the relative level of approval contributed by individual users and present it as collective level of approval using audio methods. Hence, there is a substantial need to provide efficient tools and methods by which groups of individuals, each having a portable computing device upon their person, to more easily contribute a personal level of approval or disapproval in real-time synchrony with other users, such that their approval or disapproval is presented as a collective group expression of group approval or group disapproval. Furthermore, there is a need to provide tools and methods that enable groups of users to be informed of the whole group's collective level of approval or disapproval. The present invention, as described herein, addresses these and other deficiencies present in the art.

SUMMARY OF THE INVENTION

Several embodiments of the invention advantageously address the needs above as well as other needs by providing a system for determining a group decision in real-time from a group of users, comprising: a plurality of computing devices, at least one user associated with each computing device, each computing device comprising a communications infrastructure coupled to each of a processor, a memory, a timing circuit, a display interface coupled to a display and configured to receive input from a user; a collaborative approval application stored on each memory and configured to run on each processor to: receive a representation of a text question from a collaboration server and display the text question on the display to the at least one user associated with each computing device; receive repeated user input over a decision period and repeatedly determining a frequency value from the repeated user input; determine, repeatedly during the decision period, a User Approval value based at least in part on one or more determined frequency values; send, repeatedly during the decision period, a representation of the User Approval value to the collaboration server, wherein the repeated representations of the User Approval value indicate changing of the User Approval value over time; receive, repeatedly during the decision period, an updated Group Approval value from the collaboration server; and present, repeatedly during the decision period, an indication of the updated Group Approval value to the at least one user of each computing device, wherein the repeated indications of the updated Group Approval values indicate changing of the Group Approval value over time; and the collaboration server in networked communication with the plurality of computing devices, the collaboration server including a server processor and a server memory, the processor configured to run a collaboration application stored on the server memory, the collaboration application configured to perform the steps of: send, at substantially the same time, the representation of the text question to each of the plurality of computing devices; receive, repeatedly during the decision period, the plurality of User Approval values from the plurality of computing devices; determine, repeatedly during the decision period, the updated Group Approval value based at least in part on the plurality of User Approval values; and send, repeatedly during the decision period, the updated Group Approval value to the plurality of computing devices.

In another embodiment, the invention can be characterized as a real-time group decision method for a group of users, each user of the group associated with one of a plurality of computing device, each computing device running a collaborative approval application and in communication with a collaboration server running a collaboration application, comprising the steps of; sending, by one of the computing devices, a representation of one of a question and a proposal to the collaboration server; sending, by the collaboration server, an indication of the one of the question and the proposal to the plurality of the computing devices; displaying, by each of the computing devices, the one of the question and the proposal on a display of each computing device; receiving, during a decision period, by each of a plurality of the plurality of computing devices, repeated user input, wherein user input for each of the plurality of the plurality of computing devices comprises one of tapping on the computing device and swiping on the computing device; determining, repeatedly during the decision period, by each of the plurality of the plurality of computing devices, a frequency value from the repeated user input; determining, repeatedly during the decision period, by each of the plurality of the plurality of computing devices, a User Approval value based at least in part on the determined frequency value; sending, repeatedly during the decision period, by each of the plurality of the plurality of computing device, one computing device during the time-step, the User Approval value to the collaboration server; determining, repeatedly during the decision period, by the collaboration server, an updated Group Approval value based at least in part on the plurality of received User Approval values; sending, repeatedly during the decision period, by the collaboration server, the updated Group Approval value to the plurality of computing devices; and presenting, repeatedly during the decision period, by the plurality of computing devices, an indication of the updated Group Approval value.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
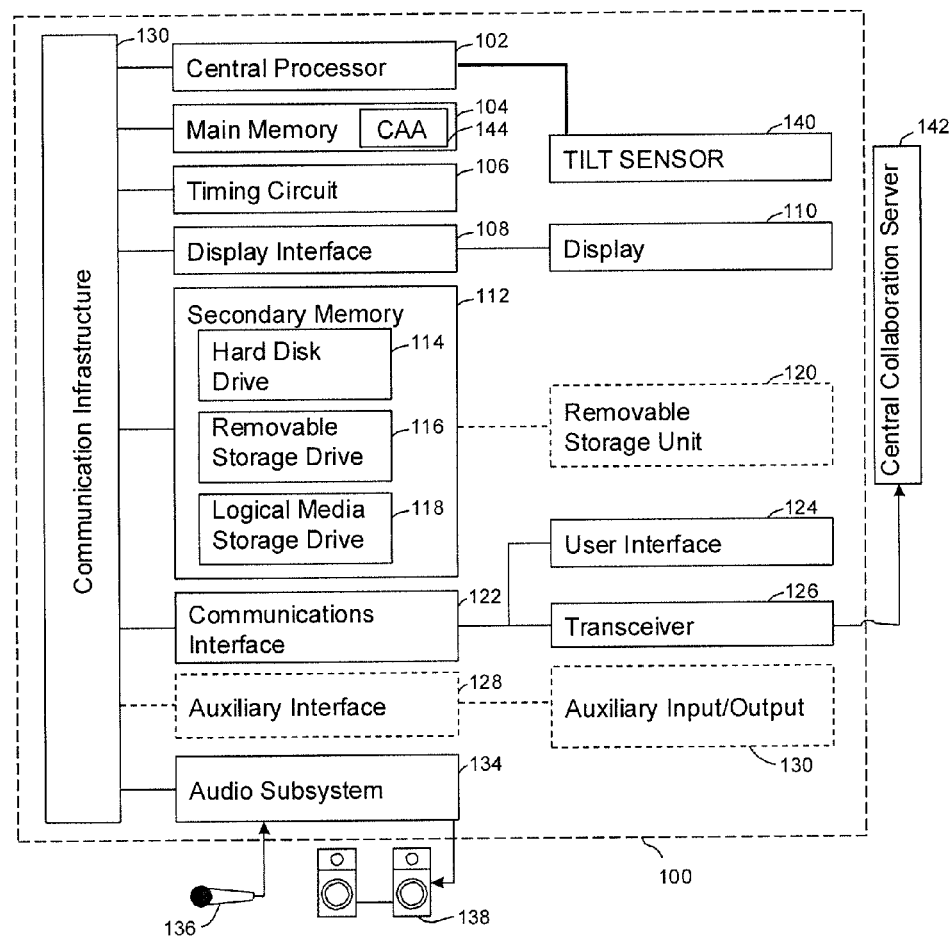
FIG. 1 is a schematic diagram of a portable computing device in one embodiment of a collaborative approval system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to text, video, audio, streaming and any combination thereof. In many preferred embodiments herein, the media item is a text question or proposal that may optionally be accompanied by an image. For example, a media item could be the text question—"Should we go see Batman Returns tonight?" accompanied with an image for the movie poster of Batman Returns. In addition, an exemplary audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction, i.e. approximately within the perceptual limits of human cognition.

Referring first to FIG. 1, a schematic diagram of a portable computing device 100 in one embodiment of the collaboration system is shown. Shown are a central processor 102, a main memory 104, a timing circuit 106, a display interface 108, a display 110, a secondary memory subsystem 112, a hard disk drive 114, a removable storage drive 116, a logical media storage drive 118, a removable storage unit 120, a communications interface 122, a user interface 124, a transceiver 126, an auxiliary interface 128, an auxiliary I/O port 130, communications infrastructure 132, an audio subsystem 134, a microphone 136, headphones 138, a tilt sensor 140, a central collaboration server 142, and a collaborative approval application (CAA) 144.

Each of the plurality of portable computing devices 100 (also referred to as mobile devices), each used by one of a plurality of users (the plurality of users also referred to as a group), is networked in real-time to the central collaboration server (CCS) 142. In some embodiments, one of the portable computing devices 100 could act as the central collaboration server 142. For the purposes of this disclosure, the central collaboration server 142 is its own computer system in a remote location, and not the portable computing device 100 of one of the users. Hence the collaboration system is comprised of the centralized central collaboration server 142 and the plurality of portable computing devices 100, each of the portable computing devices 100 used by one user.

The portable computing device 100 may be embodied as a handheld unit, a pocket housed unit, a body worn unit, or other portable unit that is generally maintained on the person of a user. The portable computing device 100 may be wearable, such as transmissive display glasses.

The central processor 102 is provided to interpret and execute logical instructions stored in the main memory 104. The main memory 104 is the primary general purpose storage area for instructions and data to be processed by the central processor 102. The main memory 104 is used in the broadest sense and may include RAM, EEPROM and ROM. The timing circuit 106 is provided to coordinate activities within the portable computing device 100. The central processor 102, main memory 104 and timing circuit 106 are directly coupled to the communications infrastructure 132. The central processor 102 may be configured to run a variety of applications, including for example phone and address book applications, media storage and play applications, gaming applications, clock and timing applications, phone and email and text messaging and chat and other communication applications. The central processor 102 is also configured to run at least one collaborative approval application (CAA) 144 stored on the main memory 104. The Collaborative Approval Application 144 may be a stand-alone application or may be a component of an application that also runs upon other networked processors.

The portable computing device 100 includes the communications infrastructure 132 used to transfer data, memory addresses where data items are to be found and control signals among the various components and subsystems of the portable computing device 100.

The display interface 108 is provided upon the portable computing device 100 to drive the display 110 associated with the portable computing device 100. The display interface 108 is electrically coupled to the communications infrastructure 132 and provides signals to the display 110 for visually outputting both graphics and alphanumeric characters. The display interface 108 may include a dedicated graphics processor and memory to support the displaying of graphics intensive media. The display 110 may be of any type (e.g., cathode ray tube, gas plasma) but in most circumstances will usually be a solid state device such as liquid crystal display. The display 110 may include a touch screen capability, allowing manual input as well as graphical display.

Affixed to the display 110, directly or indirectly, is the tilt sensor 140 (accelerometer or other effective technology) that detects the physical orientation of the display 110. The tilt sensor 140 is also coupled to the central processor 102 so that input conveyed via the tilt sensor 140 is transferred to the central processor 102. The tilt sensor 140 provides input to the Collaborative Approval Application 144, as described later. Other input methods may include eye tracking, voice input, and/or manipulandum input.

The secondary memory subsystem 112 is provided which houses retrievable storage units such as the hard disk drive 114 and the removable storage drive 116. Optional storage units such as the logical media storage drive 118 and the removable storage unit 120 may also be included. The removable storage drive 116 may be a replaceable hard drive, optical media storage drive or a solid state flash RAM device. The logical media storage drive 118 may be a flash RAM device, EEPROM encoded with playable media, or optical storage media (CD, DVD). The removable storage unit 120 may be logical, optical or of an electromechanical (hard disk) design.

The communications interface 122 subsystem is provided which allows for standardized electrical connection of peripheral devices to the communications infrastructure 132 including, serial, parallel, USB, and Firewire connectivity. For example, the user interface 124 and the transceiver 126 are electrically coupled to the communications infrastructure 132 via the communications interface 122. For purposes of this disclosure, the term user interface 124 includes the hardware and operating software by which the user executes procedures on the portable computing device 100 and the means by which the portable computing device 100 conveys information to the user. In the present invention, the user interface 124 is controlled by the CAA 144 and is configured to display information regarding the group collaboration, as well as receive user input and display group output. The CAA 144 is described in more detail below in FIG. 3.

To accommodate non-standardized communications interfaces (i.e., proprietary), the optional separate auxiliary interface 128 and the auxiliary I/O port 130 are provided to couple proprietary peripheral devices to the communications infrastructure 132. The transceiver 126 facilitates the remote exchange of data and synchronizing signals between the portable computing device 100 and the Central Collaboration Server 142. The transceiver 126 could also be used to enable communication among a plurality of portable computing devices 100 used by other participants. In some embodiments, one of the portable computing devices 100 acts as the Central Collaboration Server 142, although the ideal embodiment uses a dedicated server for this purpose. In one embodiment the transceiver 126 is a radio frequency type normally associated with computer networks for example, wireless computer networks based on BlueTooth® or the various IEEE standards 802.11.sub.x., where x denotes the various present and evolving wireless computing standards. In some embodiments the portable computing devices 100 establish an ad hock network between and among them, as with a BlueTooth® communication technology.

It should be noted that any prevailing wireless communication standard may be employed to enable the plurality of portable computing devices 100 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation of the invention. In a third alternative embodiment, the transceiver 126 may include hybrids of computer communications standards, cellular standards and evolving satellite radio standards.

The audio subsystem 134 is provided and electrically coupled to the communications infrastructure 132. The audio subsystem 134 is configured for the playback and recording of digital media, for example, multi or multimedia encoded in any of the exemplary formats MP3, AVI, WAV, MPG, QT, WMA, AIFF, AU, RAM, RA, MOV, MIDI, etc.

The audio subsystem 134 in one embodiment includes the microphone 136 which is used for the detection and capture of vocal utterances from that unit's user. In this way the user may compose a piece of media for collaborative display and approval as a verbal utterance. The portable computing device 100 may then capture the verbal utterance, digitize the utterance, and convey the utterance to other of said plurality of users by sending it to their respective portable computing devices 100 over the intervening network. In this way, the user may convey a media item verbally and have the item conveyed as verbal audio content to other users.

It should be noted that if the users are in close physical proximity some informational content may be conveyed verbally without the need for conveying it through an electronic media. The user may simply speak the content to the other members of the group who are in close listening range. The group may then express collective approval by synchronously using their portable electronic devices 100 and taking advantage of the electronic decision determination and communication processes disclosed herein. In this way the present invention may act as a supportive supplement that is seamlessly integrated into a direct face to face conversation held among a group of users.

For embodiments that do include the microphone 136, it may be incorporated within the casing of the portable computing device 100 or may be remotely located elsewhere upon a body of the user and is connected to the portable computing device 100 by a wired or wireless link. Sound signals from microphone 136 are generally captured as analog audio signals and converted to digital form by an analog to digital converter or other similar component and/or process. A digital signal is thereby provided to the processor 102 of the portable computing device 100, the digital signal representing the audio content captured by microphone 136. In some embodiments the microphone 136 is local to the headphones 138 or other head-worn component of the user. In some embodiments the microphone 136 is interfaced to the portable computing device 100 by a Bluetooth® link. In some embodiments the microphone 136 comprises a plurality of microphone elements. This can allow users to talk to each other, while engaging in a collaborative experience, making it more fun and social. Allowing users to talk to each other could also be distracting and could be not allowed.

The audio subsystem 134 generally also includes headphones 138 (or other similar personalized audio presentation units that display audio content to the ears of a user). The headphones 138 may be connected by wired or wireless connections. In some embodiments the headphones 138 are interfaced to the portable computing device 100 by the Bluetooth® communication link.

The portable computing device 100 includes an operating system, the necessary hardware and software drivers necessary to fully utilize the devices coupled to the communications infrastructure 132, media playback and recording applications and at least one Collaborative Approval Application 144 operatively loaded into main memory 104, which is designed to display information to a user, collect input from that user, and communicate in real-time with the Central Collaboration Server 142. Optionally, the portable computing device 100 is envisioned to include at least one remote authentication application, one or more cryptography applications capable of performing symmetric and asymmetric cryptographic functions, and secure messaging software. Optionally, the portable computing device 100 may be disposed in a portable form factor to be carried by a user. The portable form factor may be a wrist watch or other wearable form factor.

The portable computing device 100 includes a touch screen display 110 configured such that the user can tap the screen at a rate that is detected and measured by the CAA 144 running on the device. The portable computing device 100 may also include a motion sensor such as an accelerometer which detects user tapping of said device 100 based on a profile of impact forces. An advantage of using the accelerometer to detect tapping on the device based on impact forces is that tapping can be detected if applied anywhere on the device, not just on the active area of the touchscreen. For example, the user can tap the back of the case, and not block the screen. The CAA 144 running on the portable computing device 100 is configured to detect when the user is tapping the portable computing device 100, the CAA 144 software determining a magnitude and/or frequency of the tapping. The frequency is determined over a sample period. This sample period is shorter than the report rate from the CAA 144 to the CCS 142. For example, a frequency of tapping may be determined by the CAA 144 software over a sample period of 2 seconds. If the user tapped 7 times during those two seconds, the frequency of 3.5 taps per second is computed. A representation of the user response is reported from the CAA 144 software to the CCS software repeatedly during the decision period. If the report rate is shorter than 2 seconds, it means the user response sample periods overlap in time, which gives an accurate reflection of the time-varying nature of the user's frequency of tapping.

The CAA 144 software is further configured to determine a User Approval Magnitude from at least one of the rate of tapping imparted by the user on the touchscreen display 110, the rate of tapping imparted by the user on the casing of the portable computing device 100, and the magnitude of tapping of the portable computing device 100 by the user. The CAA 144 software is further configured to repeatedly send to the CCS 142, in real time, an indication of a User Approval value based at least in part on the User Approval Magnitude. In some embodiments the indication of the User Approval value is the User Approval Magnitude. Software on the CCS 142 collects the indications of User Approval values from each of the plurality of users who are collaboratively expressing group approval or rejection with respect to a presented media item. The CCS 142 does this, at least in part, by repeatedly computing, in real-time, based on the User Approval values repeatedly received from the plurality of computing devices 100, a Group Approval Magnitude. As the User Approval values change over time, so will the Group Approval Magnitudes. The CCS 142 then sends an indication of the Group Approval Magnitude, termed a Group Approval value, to each of the plurality of computing devices in real time. In some instances the Group Approval value is the same as the Group Approval Magnitude.

The Group Approval Magnitude may be computed as a simple average of the User Approval values received at the current time-step.

The Group Approval Magnitude may be computed as a weighted average of the User Approval values received at the current time-step. In such embodiments, the weighting values may be based, at least in part, upon historical data of the collaborative performance of that user with respect to other users.

Figure 2:
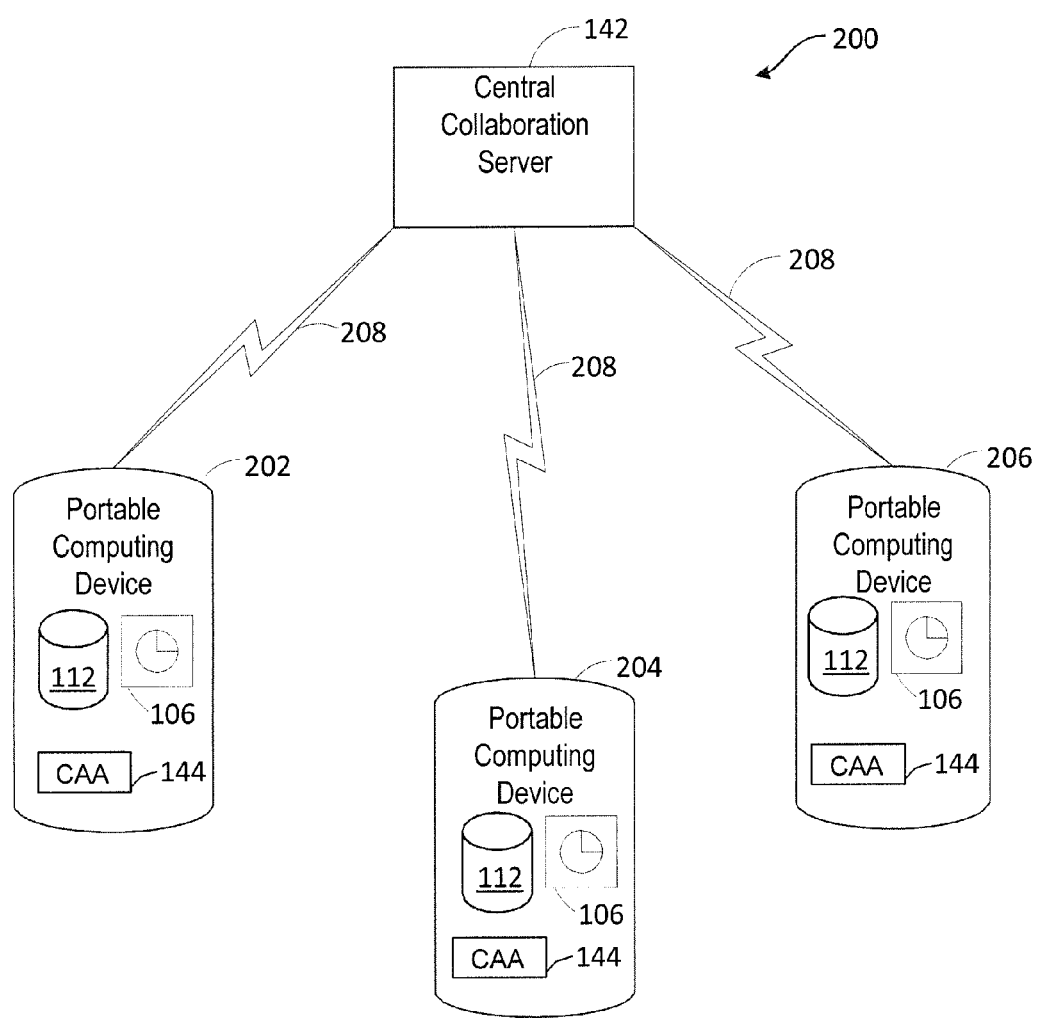
FIG. 2 is a schematic diagram of a collaborative approval system in accordance with one embodiment of the present invention.

Referring next to FIG. 2, a collaborative decision system 200 is shown in one embodiment of the present invention. Shown are the central collaboration server 142, the plurality of the secondary memory subsystems 112, the plurality of the timing circuits 106, the plurality of collaborative intent applications 144, a first portable computing device 202, a second portable computing device 204, a third portable computing device 206, and a plurality of exchanges of data 208.

The group of users (collaborators), each using one of the plurality of portable computing devices 100, each portable computing device 100 running the Collaborative Approval Application 144, each device 100 in communication with the Central Collaboration Server 142, may engage in the collaborative experience that evokes a collective intelligence such that the group's collective approval, rejection or decision is evoked through a closed-loop dynamic control system. In other words, this system is not a simple poll or survey of approval values, but a dynamic system with real-time feedback such that users convey time-varying approval levels in synchrony, all users experiencing a representation of the resulting group approval level, and adjusting their input in real time, over a period of decision processing. The period of decision processing may be, for example, 15 seconds.

Thus during the 15 second decision period, all users are continually updating their expression of approval or rejection (by changing the frequency and/or magnitude of tapping on the mobile device 100) while viewing or listening to the real-time representation of the Group Approval value.

In some embodiments a plurality of target areas are designated on the screen of the mobile device 100, the user instructed to tap one or more target areas. In some embodiments, an approval target area and a rejection target area is provided such that tapping on the approval target area indicates a level of approval, while tapping on the rejection target area indicates a level of rejection. In some such embodiments, the level of approval is computed based at least in part on the frequency of tapping of the approval target area. In some such embodiments, the level of rejection is computed based at least in part on the frequency of tapping of the rejection target area. In such embodiments, the level of rejection is reported as a negative value for the User Approval value. Thus, such embodiments can selectively report a positive User Approval value for a user who is tapping the approval target area based on the frequency of tapping of the approval target area, and report a negative User Approval value for a user who is tapping the rejection target area based on the frequency of tapping the rejection target area. This allows for a wider range of response from the synchronous group of real-time collaborative users.

Thus during the decision period, the plurality of collaborating users are enabled to continually update their expression of approval or rejection (by changing the frequency and/or magnitude of tapping on the portable computing device 100) while viewing or listening to the real-time representation of the Group Approval value. Meanwhile, the CCS receives the plurality of real-time User Approval values and adjusts the Group Approval values sent back to the users, creating a feedback loop around the group of users in real-time.

In this way, a closed loop system is created that emulates the behavior of a real crowd. In a real crowd, a single user does not laugh or clap boo in isolation, but changes his or her laughing or clapping or booing in real time, feeding off the people around him. The result is a control system that converges upon an appropriate level of collective feedback, everyone adjusting to everyone else in real time until a consensus level of approval is attained. This results is a more natural and satisfying method of providing indications of approval as compared to polls and surveys (such as upvoting or rating items using starts or thumbs-up). Such systems are subject to sequential error biases known as snow-balling. The closed-loop system described herein is a significant improvement, avoiding snowballing effects by enabling all users to express feedback in synchrony. The users' feedback to allow the synchronous response to reach a level of convergence—an emergent consensus level of approval that truly reflects the collective will of the group. In this way a more intelligence, accurate, and insightful form of networked feedback is enabled. And because a decision can be collectively reached by the group based on the Group Approval value exceeding a defined threshold (or not exceeding), the closed loop system allows a group to collectively feel each other out, and determine as collaborative system if as a synchronous system, collaborative approval is desired. In some such embodiments, consensus on a collective real-time approval is determined based upon a positive Group Approval value exceeding a positive threshold. In some such embodiments, collective real-time rejection is determined based upon a negative Group Approval value exceeding a negative threshold.

As shown in FIG. 2, the exemplary collaborative system 200 the CCS 142 is in communication with the plurality of portable computing devices 202, 204, 206. Each of these devices 202, 204, 206 is running the Collaborative Approval Application (CIA). In one example, each of the devices 202, 204, 206 is an iPad® running the CAA 144, each iPad® communicating with the CCS 142 which is running a Collaboration Approval Application. Thus, we have the local CAA 144 on each of the plurality of devices 202, 204, 206, each device 202, 204, 206 in real-time communication with the CAA 144 running on the CCS 142. While only three portable devices 202, 204, 206 are shown in FIG. 2 for clarity, in ideal embodiments, dozens, hundreds, thousands, or even millions of devices 100 would be employed in the collaboration system 200. Hence the CCS 142 must be in real-time communication with many devices 100 at once.

The communication between the CCS 142 and each of the devices 202, 204, 206 includes the exchanges of data 208. The data has a very significant real-time function, closing the loop around each user, over the intervening electronic network. This enables the evocation of an emergent collective group approval, group rejection, or other form of collective group decision.

As described above, the present invention allows the group of users, each using their own tablet or phone or other similar portable computing device 100, to collaboratively express a real-time group approval to a media item such as a text question or text proposal, picture, video, or combination of video, audio, and text in real-time with the support of the closed-loop mediating system of the CCS 142 which communicates with the local CAA 144 running on each device 100. The Collaborative Approval Application 144 connects each device 100 to the overall collaborative system 200. Multiple embodiments of the CAA 144 are disclosed herein. The Collaborative Approval Application (CAA) 144 may be architected in a variety of ways to enable the plurality of portable computing devices 100 to engage in the collaborative closed-loop processes described herein, with the supportive use of the Central Collaboration Server 142.

In some embodiments the exchange of data 208 may exist between portable computing devices 100.

Figure 3:
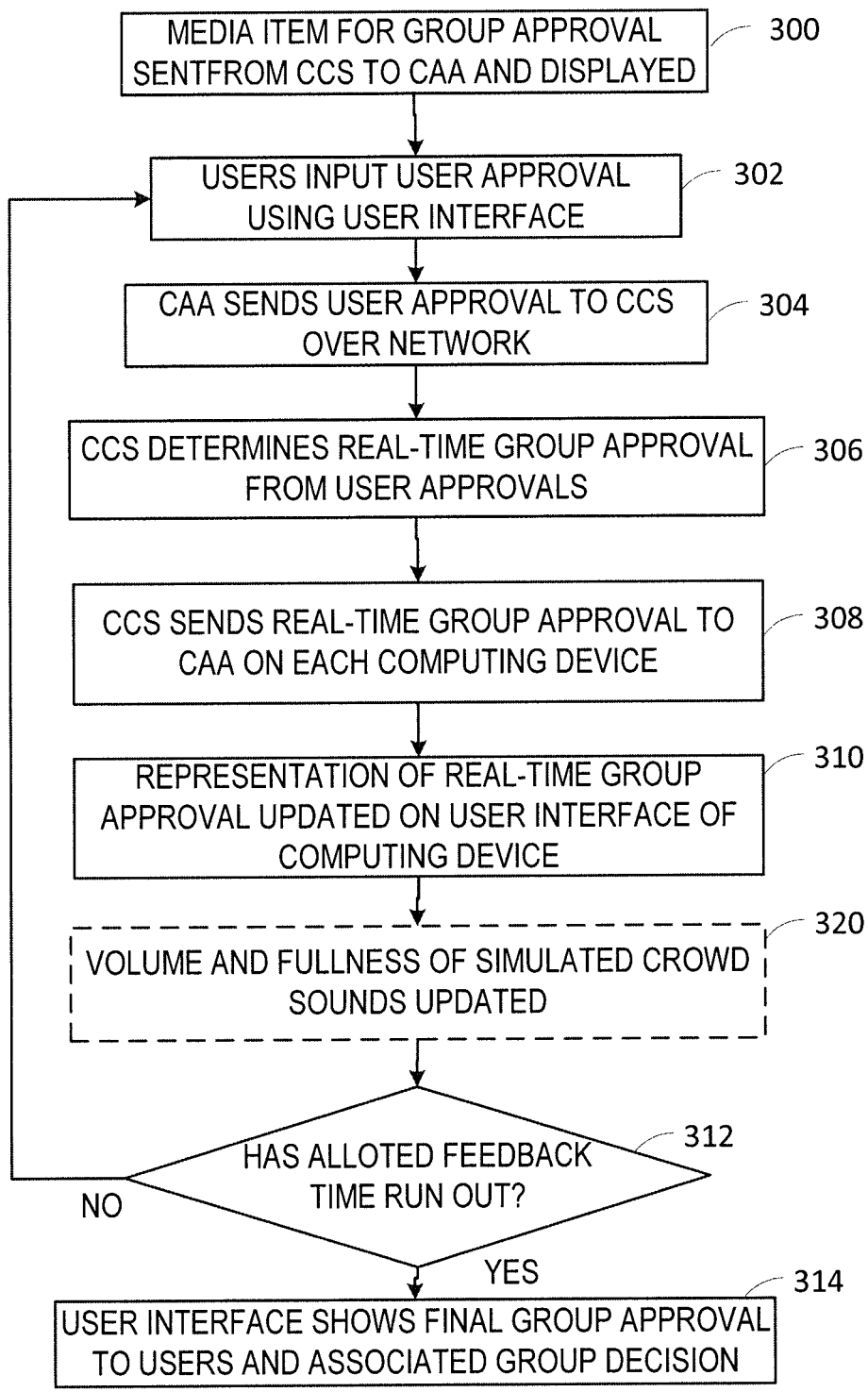
FIG. 3 is a flowchart diagram of a group collaboration process in one embodiment of the present invention.

Referring next to FIG. 3, a flowchart of one embodiment of a group collaboration process is shown, said process starting with the identification of a media item and executing as a real-time closed-loop dynamic system over a decision period. The decision period is generally defined such that the decision period is long enough for a collaborative approval to synchronously emerge from the dynamic system through iterative feedback, but short enough that the users do not get tired of tapping. In general, the decision period is defined to be of a similar duration as an in-person crowd might clap or boo or otherwise express a reaction. Such a time period may be, for example, 15 to 60 seconds. The process generally ends with a collaborative decision indication being generated and presented, said collaborative decision indication being based largely upon whether the Group Approval Magnitude exceeds a threshold. In some instances, exceeding the threshold is determined by the magnitude exceeding a value during any time-step of the decision period. In other instances, exceeding the threshold is determined by the magnitude exceeding a threshold value for more than a threshold amount of time. Thus in those embodiments, two threshold values must be met: a magnitude level and a time duration for which the magnitude level is exceeded.

To make this clear, consider the following example. A group of 10 friends are using the collaborative system defined herein. They want to decide where to go for dinner. All are using portable computing devices 100 running the CAA 144 locally, all said portable computing devices 100 in network communication with the Central collaboration Server 142 running the CCS 142 application. One of the users engages the CAA 144 on his portable computing device 100 and sends a media item to the others in the group. This media item, for example, may be a photo of a restaurant that the user is proposing the group meet at for dinner, along with text that says "How about here?" The media item is sent by the CCS 142 to each of the computing devices 100 and is displayed in approximately simultaneously to the users of those devices 100 by the screens of those devices 100, as coordinated by the collaborative approval applications 144 on those devices 100.

In response to the presentation of the photo of the restaurant and associated text, the users express approval through a real-time closed loop process such that they tap on the screen of their device 100 at a frequency that indicates their personal real-time level of approval, with faster frequency indicating higher approval. Those users who are eager to go to the restaurant in the photo will tap aggressively, while those who are lukewarm will tap mildly. Each CAA 144 determines the frequency of tapping for the user of that device 100 for the current time-step. The frequency is then used alone, or in part, to compute the individual User Approval Magnitude of each user for that time-step. In the simplest case the User Approval Magnitude is a direct representation of the frequency of tapping. A representation of the User Approval Magnitude for that time-step, the User Approval value, is then sent over the communication network to the CCS 142. The plurality of computing devices 100 (representing a plurality of user input) send User Approval values at substantially the same time (for the same time-step). The CCS 142 then determines the Group Approval Magnitude value for that time-step. The Group Approval Magnitude may be a simple average or weighted average of the set of User Approval values received from the users. The CCS 142 sends an indication of the Group Approval Magnitude, the Group Approval value, to each of the computing devices 100 in substantially real-time.

The CAA 144 on each computing device 100 is configured to display a representation of the current real-time Group Approval value to the user of each device 100 at substantially the same time, allowing the plurality of users to see and/or hear an indication of the Group Approval value and adjust their input accordingly. This creates a closed-loop collaborative system wherein the plurality of users are working in synchrony to converge upon a collective level of approval.

In a preferred embodiment, the Group Approval value is displayed by each computing device 100 by modulating the volume and optionally the fullness of a simulated sound of crowd clapping. If the Group Approval value is high, the sound of crowd clapping is loud. If the Group Approval value is low, the sound of crowd clapping is low. Thus the greater the Group Approval value, the greater the simulated crowd volume. Fullness is represented by how many simulated hands are clapping. High fullness is represented by many hands clapping in the simulated sound. The fullness of the simulated crowd sound is determined by at least one of (a) the number of users who are indicating approval above some level, and (b) the total group magnitude level. Thus if all 10 of the 10 users are inputting approval by tapping above some threshold frequency (none are sitting still), then a high volume and high fullness simulated crowd sound is output by the CAA 144 on each computing device 100. If only half of the 10 users are inputting approval by tapping on the screen above some threshold frequency (half are holding still), then the fullness will be displayed at half of the full magnitude, as if half the number of hands were clapping in the simulated crowd sound.

Thus, the fullness of the crowd sound is scaled at each time-step based on the percentage of the full set of users who are inputting a tapping that exceeds a minimum threshold value. The volume is modulated based on the level of Group Approval value reached at each time-step. In this way, the crowd sound changes over the decision period based on the number of users who are inputting approval at a frequency above a minimum value at each time-step, as well as based on the Group Approval Magnitude that is computed by the CCS 142 at each time-step. And because the users can hear the sound and adjust their personal input at each subsequent time-step, a real-time closed loop dynamic feedback system is enabled such that the group can converge upon a consensus level of approval in a smooth, natural, intuitive, and efficient manner.

As described above, in some embodiments users are provided with the plurality of target areas that they can selectively tap, each target area associated with a different type of approval. In a preferred embodiment, two target areas are provided, one associated with approval and one associated with rejection. As described previously, tapping the approval target area triggers the mobile device 100 to report a positive value for User Approval value, the higher the frequency of tapping the larger the positive number. Conversely, tapping the rejection target area triggers the mobile device 100 to report a negative value for the User Approval value, the higher the frequency of the tapping, the more negative the value reported (i.e. the larger negative number).

Thus, the plurality of computing devices 100 send values at substantially the same time (for the same time-step), those values being a mix of positive approval values and negative rejection values. The CCS 142 then determines the Group Approval Magnitude for that time-step. The Group Approval Magnitude may be a simple average or weighted average of the set of User Approval values received from the users. The CCS 142 determines the Group Approval value based at least in part on the Group Approval Magnitude, and sends the Group Approval value to each of the computing devices 100 in substantially real-time. If the computed group value is positive, a positive Group Approval value is reported, indicating a level of group approval, the more positive, the stronger the approval. If the computed group value is negative, a negative Group Approval value is reported, indicating a level of group rejection, the more negative the value the stronger the rejection.

The CAA 144 on each computing device 100 is configured to display a representation of the current real-time Group Approval value to the user of each device 100 at substantially the same time, allowing the plurality of users to see and/or hear an indication of the Group Approval value and adjust their input accordingly. For embodiments where the display is an audio crowd sound, as described above, an additional feature can be enabled such that positive Group Approval values are represented as audio claps or cheers, while negative Group Approval values are represented as audio boos or jeers. This creates a closed-loop collaborative system wherein the plurality of users are working in synchrony to converge upon a collective level of approval.

In some embodiments, the Group Approval value is displayed by each computing device 100 by modulating the volume and optionally the fullness of the simulated clapping, cheering, booing, or jeering based on the sign (positive or negative) and absolute value of the Group Approval value. If the Group Approval value is positive, with a high absolute value, the sound of crowd clapping is loud. If the Group Approval value is positive, with a low absolute value, the sound of crowd clapping is soft. If the Group Approval value is negative, with a high absolute value, the sound of booing or jeering is loud. If the Group Approval value is negative, with a low absolute value, the sound of booing or jeering is soft. Fullness is represented by how many simulated people are clapping or booing. High fullness is represented by many people clapping or booing in the simulated sound. The fullness of the simulated crowd sound is determined by at least one of (a) the number of users who are indicating approval above some level, and (b) the Group Approval value.

Referring again to FIG. 3, shown are a collaboration media item step 300, a user input step 302, a send User Approval values to CCS step 304, a determine Group Approval Magnitude step 306, a send Group Approval value to CAA step 308, a present real-time group approval step 310, a time decision point 312, and a display final group approval and group decision step 314. The process also includes optional steps that could be included, for example, for embodiments that display the real-time Group Approval value as an audio representation of a simulated crowd, update audio step 320 is included following the present real-time group approval step 310. At optional update audio step 320, the simulated crowd sound is updated based on the real-time Group Approval value and optionally based upon the number of users who conveyed the User Approval value that was above a minimum value in the prior time-step. If both values are used, the Group Approval value is generally used to scale the volume of the simulated crowd sound, while the number (or percentage) of users who conveyed a User Approval value that was above a minimum value is used to scale the fullness of the simulated crowd sound. Thus if a large percentage of users are conveying vigorous approval (by tapping or swiping at a high frequency), the simulated crowd sound will be both loud and full, full meaning simulated to represent many clapping hands (with 'not full' meaning simulated to represent few clapping hands).

In the collaboration media item step 300, the CCS 142 receives a piece of media from one of the plurality of users, the piece of media conveyed by the CAA 144 running on the portable computing device 100 of that user. The CCS 142 then relays the piece of media from the CCS 142 to the CAA 144 running on each of the plurality of computing devices 100. The CAA 144 of each device 100 displays the media item on the display 110 of the portable computing device 100 (PCD). The shared piece of media may be, for example, an image of shoes with text question to be answered, for example, "Should I buy these shoes?" The process then proceeds to the user input step 302.

The user input step 302 includes each of the plurality of users using the display 110 of the portable computing device 100 to input the user approval with respect to the media item. The user approval is conveyed as either a frequency of repeated tapping of the touchscreen display 110 or a frequency of repeated tapping of the casing of the computing device 100.

The CAA 144 then determines the User Approval Magnitude based on the user input. The CAA 144 then determines the User Approval value based at least in part on the User Approval Magnitude and indicating a level of user approval for a current time-step, computed over a sampling period. The user input step 302 takes place for each user of the group. The process then proceeds to the send User Approval values to CCS step 304.

In the send User Approval values to CCS step 304, the CAA 144 for each computing device 100 sends the user approval to the CCS 142 for the current time (sampling) period.

In the next step, the determine Group Approval Magnitude step 306, the CCS 142 determines the collective Group Approval Magnitude for the current time-step based on the plurality of real-time User Approval values received. The Group Approval Magnitude may be determined through various methods, for example as a real-time average for each time-step, a weighted average for each time-step, or a non-linear average for each time-step. The CCS 142 then determines the Group Approval value based at least in part on the Group Approval Magnitude. The process then proceeds to the send Group Approval value to CAA step 308.

In the send Group Approval value to CAA step 308, each CAA 144 receives the Group Approval value from the CCS 142. Next, in the present real-time group approval step 310, for each portable computing device 100 the representation of the received real-time Group Approval value is displayed. The display of the group approval may be configured to be visual and/or audio such that the user of each portable computing device 100 is given a real-time indication of the current approval level of the entire group as a singular collective entity. In some embodiments a brightness feature is scaled based on the current real-time Group Approval value. In some embodiments a color feature is scaled based on the current real-time Group Approval value. In some embodiments a graphical size feature is scaled based on the current real-time Group Approval value. In some embodiments an audio volume and/or audio pitch value is scaled based on the current real-time Group Approval value. The process then proceeds to the time decision point 312.

The update audio step 320 may be inserted after the present real-time group approval step 310, adding a simulated crowd sound of clapping, cheering, booing, or hissing. The sound is scaled as described previously based on the real-time Group Approval value and optionally the number (or percentage) of users who are responding with a User Approval value above a threshold. In some such embodiments, the sign of the Group Approval value determines if the simulated crowd sound is a clap, cheer, or boo. In some such embodiments, a boo sound is selected if the Group Approval value is a negative number, the volume and/or fullness of the boo sounds dependent at least in part on the magnitude of the negative value.

In the time decision point 312, if the defined decision time is up and the Group Approval value has not exceeded a defined threshold, the process ends and the media item will be determined by the CCS 142 software not to be collectively approved. Conversely, if the Group Approval exceeds the one or more thresholds defined before the time is up, then the process ends and the media item will be determined by the CCS software to have been collectively approved. In some embodiments, a positive and negative threshold is used, the media item being approved is the Group Approval value is above the positive threshold, the media item being rejected if the Group Approval value is below the negative threshold. In such embodiments, the range between the positive and negative thresholds can be configured to indicate that the decision is indecisive. If the time runs out while the Group Approval value is still in the indecisive range, the software may be configured to display "No Decision" and the users are given the option of repeating the process. In some embodiments the words "Brain Freeze" is displayed instead of "No Decision".

The process proceeds to the display final group approval and group decision step 314, and a representation of the final Group Approval value is displayed on the display 110 as visual and/or audio. If the Group Approval value has been determined to be affirmative, an indication of that affirmative decision is displayed to each user of each portable computing device 100. This may be an affirmative word such as "Approved!" or "Accepted!" or "Yes". If the Group Approval value falls below a negative threshold, or if the time runs out without the positive threshold being exceeded, an indication that a negative decision is displayed to each user of the portable computing device 100. This may be a negative word such as "Rejected!" or "No."

If the time has not run out in the time decision point 312 and the Group Approval value has not exceeded the one or more threshold values, the process returns to the user input step 302, and the process repeats until the real-time closed loop system converges upon a final Group Approval value or until the process is otherwise ended (for example, by the time limit).

After the media item has been assigned an approval decision based on the collaborative Group Approval value, the entire process may repeat, for example, to determine a group approval decision with respect to a different media item from a different user.

Referring again to FIGS. 1, 2 and 3, the present invention in one embodiment employs the CCS 142 that users connect to via their portable computing device 100. In some embodiments, fixed or non-portable computing devices 100 can be used as well. In many embodiments, users choose or are assigned a username when they log into the CCS 142, thus allowing software on the CCS 142 to keep track of individual users and assign each one a score based on their prior sessions. This also allows the CCS 142 to employ user scores when computing the average of the Group Approval of all the users (in embodiments that use the average).

In some such embodiments, the user earns points if he or she proposes a media item that is approved by the group. In some embodiments, the user loses points if he or she proposes a media item that is not approved by the group.

In general, when the session is in progress, the media item is sent from the CCS 142 to each of the CAA 144 on the portable computing devices 100 of the users. In response to the media item, the users convey their own approval by tapping at a frequency. The CCS 142 in some embodiments computes the numerical average (either a simple average or a weighted average) of the plurality User Approval values for the current time-step. In some embodiments, the scores mentioned above are used to compute the weights used in computing the Group Approval value from the set of User Approval values. Thus a user with a higher score will have his or her User Approval value weighted higher in the average than a user with a lower score. Using the numerical average, the CCS 142 updates for the current time-step a Group Approval. This is conveyed as a real-time value sent from the CCS 142 to each of the CAA 144 of participating users on their own devices 100.

In some embodiments of the present invention, the media item is a live video stream that is captured by a camera on the portable computing device 100 of one of the users in the group and relayed as a live-feed to the portable computing devices 100 of each of the other users in the group. The present invention then allows for real-time closed-loop expressions of group approval during the display of the steaming video feed. In some preferred embodiments, these expressions of group approval are conveyed as continuous real-time simulated crowd sounds based upon real-time Group Approval values computed from the real-time User Approval values. In such embodiments, there may not be a time limit, the dynamic system instead running throughout the duration of the live video stream. In this way a group of distributed users, networked into a real-time collaborative dynamic system, can collectively cause the generation of simulated crowd sounds that they all hear as a result of each of them tapping their screens with a frequency that indicates their level of approval of the streaming content. Said crowd sounds are displayed as overlaid sounds on the live video, said overload sounds being simulated applause, cheers, boos, or hisses. In some such embodiments, the Group Approval Value is integrated over time (the duration of the live video stream) to compute an Overall Group Approval Value. The Overall Group Approval Value is based on how vigorously the users were tapping their devices 100 during the period of the live video. The Overall Group Approval Value can then be used to assign a rating to the live video stream. This rating is far more indicative of user satisfaction than if the users were asked to simply give a thumbs up, for it reflects the convergence of a dynamic feedback loop.

A benefit of the present invention is that it enables a group of users to form a real-time closed-loop dynamic system that converges on a level of Collaborative Agreement over a period of time, but does so in a manner that does not require substantial visual attention. This is critical for mobile applications where users may be doing other things, such as walking or eating or working with others, and are unable to devote continuous visual attention to the screen of their portable computing device 100 during the collaborative decision period. Thus unlike the prior application by the present inventor (U.S. patent application Ser. No. 14/668, 970) in which groups collaboratively target specific locations on a screen using continuous visual attention, the present invention allows for a far less visually intensive interface while still allowing the group to adapt in real-time as a closed-loop dynamic system. For example, a user can tapping on the screen while listening to real-time changes in the simulated crowd sounds, thus adjusting his or her level of approval without visually looking at the screen (other than to view the initial piece of media and to view the final results). But, during the period of collaborative approval generation, little or no visual attention is required.

As an alternative to tapping of the portable computing device 100, a spinning interface is also disclosed herein in which an approximately circular object that's rotatable is displayed on the touchscreen display 110, the circular object visually rotatable around a center point. Users can impart a desired spin on the rotatable object by swiping the screen upon or near the object. If the direction of the swipe is such that it conveys a clockwise rotation of the rotatable object, a positive indication of User Approval value is determined for that user at that time-step by the CAA 144 and sent from the CAA 144 to the CCS 142. Conversely, if the direction of the user swipe is such that it conveys a counter-clockwise rotation of the rotatable object, a negative indication of User Approval value is determined by the CAA 144 for that user for that time-step and sent by the CAA 144 to the CCS 142. As with the prior embodiments, the swiping interface is engaged repeatedly by the over time during the approval period, the frequency of the swiping by a user being used as a primary indicator of User Approval value for that sample period. In addition, the speed of each swipe and/or the size of each swipe may be used as an indicator of the User Approval value for that time period.

In this way, a plurality of users can all see the same rotatable object on their screen and swipe at it with a clockwise or counter-clockwise intent. The CCS 142 receives the User Approval values from the plurality of users and computes the Group Approval value for that moment in time. The rotatable object is then updated visually with a rotational velocity that is determined from the Group Approval Value. Thus if, for example, the aggregation of real-time User Approval Values from the users indicates a collective desire for a clockwise rotation, the CCS 142 indicates a clockwise rotational velocity of the rotatable object. Further, the higher the Group Approval value (based upon the plurality of inputs), the faster the rotational velocity of the displayed rotatable object. Conversely, if the aggregation of real-time input from the users indicates a collective desire for a counter-clockwise rotation, the CCS 142 indicates a clockwise rotational velocity of the rotatable object. Further, the higher the counter-clockwise value (based upon the plurality of inputs), the faster the rotational velocity of the displayed rotatable object in the counter-clockwise direction.

In preferred embodiments the rotatable object is modeled as a physical system with a rotational inertia and rotational damping. The speed of the rotatable object at each moment in time during the closed-loop collaborative process is based on the input from the users and the physics model of the rotatable object. In this way, the plurality of users can collectively input repeated swipes at the rotatable object, some swipes indicating clockwise motion, some swipes indicating counter clockwise motion, the frequency and magnitude of the swipes indicating a strength of each user's real-time input, such that the rotational motion viewed by all users is a collaborative result of all the real-time input. In this way the group can converge on a level of approval (or disapproval) of a media item based on how fast the rotatable object rotates in the clockwise direction (for approval) or the counter-clockwise direction (for disapproval). The rotational speed of the rotatable object can be combined with an audio sound, for example a sound that increases in pitch with the speed of the object and maybe changes in tone with the direction of motion. In this way, the user can converge with the collective will of the group in a visually non-intensive manner. In fact, the user can apply swipes without even looking at the screen, just listening to the audio.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for interactively converging upon a group decision by creating a real-time closed-loop control system among a group of users, comprising:
   a plurality of computing devices, at least one user associated with each computing device, each computing device comprising a communications infrastructure coupled to each of a processor, a memory, a timing circuit, a display, and a user interface, wherein the user interface includes a first target area for receiving user input and a second target area for receiving user input, wherein the first target area and the second target area are different areas;
   a collaborative approval application stored on each memory and configured to run on each processor to, generally simultaneously on each computing device during a decision period having a plurality of time steps, perform the steps of:
      receive and display an indication of one of a question, a proposal and a graphical media item for collaborative decision;
      receive, during the decision period, user input comprising a repeated input to the user interface, wherein the repeated input is one of repeated tapping of the user interface and repeated swiping of the user interface;
      determine, for each time step, a frequency of the repeated user input based on number of inputs received by the user interface over a sample period;
      determine, for each time step, a User Approval value based at least in part upon the location of the user input and the frequency of the user input such that a higher frequency of the user input corresponds to a higher User Approval value and such that the location of the user input within the first target area assigns a positive sign to the User Approval value and the location of the user input within the second target area assigns a negative sign to the User Approval value;
      send, for each time step, a representation of the User Approval value to a collaboration server, wherein each representation of the User Approval value indicates changing of the User Approval value over time;
      receive, for each time step, an updated Group Approval value from the collaboration server; and
      present, for each time step, an indication of the updated Group Approval value, wherein the indication of the updated Group Approval value is determined by at least one instruction, and wherein the repeated indications of the updated Group Approval values indicate changing of the Group Approval value over time; and
   the collaboration server in networked communication with the plurality of computing devices, the collaboration server including a server processor and a server memory, the processor configured to run a collaboration application stored on the server memory, the collaboration application configured to perform the steps of:
      send the indication of one of the question, the proposal and the graphical media item to each of the plurality of computing devices;
      receive, for each time step, the plurality of representations of User Approval values from the plurality of computing devices;
      determine, for each time step, the updated Group Approval value based at least in part on the plurality of User Approval values;
      determine, for each time step, whether the updated Group Approval value exceeds a pre-determined threshold value;
      send, for each time step for which the updated Group Approval value has not exceeded the threshold value, the updated Group Approval value to the plurality of computing devices;
      in response to determining that the updated Group Approval value has exceeded the threshold value, end the decision period by the collaboration server; and
      determine, in response to determining that the updated Group Approval value has exceeded the threshold value, that the one of the question, the graphical media item and the proposal is associated with a decision selected from the group of acceptance and rejection.

2. The system of claim 1, wherein the collaboration server is further configured to determine that the decision period is ended and the decision is selected when the updated Group Approval value exceeds the threshold value for more than a threshold length of time.

3. The system of claim 2, wherein the collaboration server is further configured to send an indication of the decision to the plurality of computing devices, wherein the computing devices are configured to display a representation of the decision.

4. The system of claim 1, wherein the updated Group Approval value is determined by computing a weighted average of the plurality of User Approval values.

5. The system of claim 4, wherein weights used in computing the weighted average are based on historical data for the participating users.

6. The system of claim 1, wherein the plurality of computing devices are further configured to emit audio, and wherein the indication of the updated Group Approval value is an audio signal, and wherein the at least one instruction for presenting the indication of the updated Group Approval value includes increasing a loudness of the audio signal as the updated Group Approval value increases.

7. The system of claim 6, wherein the audio signal is a crowd sound.

8. The system of claim 1, wherein the presenting of the indication of the updated Group Approval value comprises a graphical image displayed on the display, and wherein the at least one instruction includes scaling a size of the graphical image based on the updated Group Approval value.

9. The system of claim 1, wherein the at least one instruction includes scaling a color feature based on the updated Group Approval value.

10. The system of claim 1, wherein the plurality of computing devices are further configured to emit audio, and wherein the indication of the updated Group Approval value is an audio signal, and the at least one instruction includes decreasing a loudness of the sounds as the updated Group Approval value decreases.

11. A real-time group decision method for interactively converging upon a group decision by creating a real-time closed-loop system among a group of users, each user of the group associated with one of a plurality of computing devices, each computing device having a user interface and running a collaborative approval application and in communication with a collaboration server running a collaboration application, comprising the steps of;
    sending, by the collaboration server, an indication of the one of a question, a graphical media item, and a proposal to the plurality of the computing devices;
    displaying, by each of the computing devices, the indication on a display of each computing device;
    receiving, during a decision period having a plurality of time steps, by each of a plurality of the plurality of computing devices, repeated user input via the user interface, wherein user input for each of the plurality of the plurality of computing devices comprises a repeated input to the user interface, wherein the repeated input is repeated swiping of the user interface, by the user, of a user-rotatable circular spinning interface displayed on the display of the computing device;
    determining, for each time step of the decision period, by each of the plurality of the plurality of computing devices, a frequency of the repeated user input based on number of inputs received by the user interface over a sample period;
    determining, for each time step, by each of the plurality of the plurality of computing devices, a User Approval value based at least in part on the frequency of the user input such that a higher frequency of the user input corresponds to a higher User Approval value;
    sending, for each time step, by each of the plurality of computing devices, the User Approval value to the collaboration server;
    determining, for each time step, by the collaboration server, an updated Group Approval value based at least in part on the plurality of received User Approval values;
    determining, for each time step, by the collaboration server, whether the updated Group Approval value exceeds a pre-determined threshold value;
    sending, for each time step for which the updated Group Approval value has not exceeded the threshold value, by the collaboration server, the updated Group Approval value to the plurality of computing devices;
    presenting, for each time step for which the updated Group Approval value has not exceeded the threshold value, by the plurality of computing devices, an indication of the updated Group Approval value, wherein the indication of the updated Group Approval value includes a displayed rotational speed of the spinning interface, and wherein the repeated indications of the updated Group Approval values indicate changing of the updated Group Approval value over time;
    in response to determining that the updated Group Approval value has exceeded the threshold value, ending of the decision period by the collaboration server; and
    determining, in response to determining that the updated Group Approval value has exceeded the threshold value, by the collaboration server, that the one of the question, the graphical media item and the proposal is associated with a decision selected from the group of acceptance and rejection.

12. The real-time group decision method of claim 11, wherein a last updated Group Approval value determined during a last time period of the decision period is a final Group Approval value.

13. The real-time group decision method of claim 12, wherein an indication of the final Group Approval value is sent to and displayed by the plurality of computing devices.

14. The real-time group decision method of claim 11, wherein the at least one instruction includes repeated displaying of the indication of the updated Group Approval value on the display.

15. The real-time group decision method of claim 11, wherein the plurality of computing devices are further configured to emit audio, and wherein the indication of the updated Group Approval value includes an audio signal outputting a simulation of crowd sound.

16. The real-time group decision method of claim 15, wherein the simulation of the crowd sound selectively includes one of simulated clapping sounds and simulated boo sounds, the selection based at least in part on the updated Group Approval value.

17. The real-time group decision method of claim 15, wherein at least one of a volume and a fullness of the crowd sound is repeatedly varied based on the updated Group Approval value.

18. The real-time group decision method of claim 11, wherein swiping resulting in a clockwise rotation of the spinning interface indicates a positive User Approval value indication and swiping resulting in a counterclockwise rotation indicates a negative User Approval value indication.

19. The real-time group decision method of claim 11, wherein the updated Group Approval value is determined by computing a weighted average of the plurality of User Approval values.

* * * * *